United States Patent
Kim et al.

(10) Patent No.: US 9,562,991 B2
(45) Date of Patent: Feb. 7, 2017

(54) POLYMER FOR OPTICAL FILM, AND OPTICAL FILM INCLUDING SAME

(71) Applicants: SAMSUNG ELECTRONICS CO., LTD., Suwon-si, Gyeonggi-do (KR); CHEIL INDUSTRIES INC., Gumi-si, Gyeongsangbuk-do (KR)

(72) Inventors: Hyung Jun Kim, Suwon-si (KR); Kyoung Ah Oh, Seoul (KR); Eun Kyung Lee, Seoul (KR); Kyu Yeol In, Seoul (KR); Myung Sup Jung, Seongnam-si (KR); Won-Cheol Jung, Seoul (KR)

(73) Assignees: SAMSUNG ELECTRONICS CO., LTD., Gyeonggi-do (KR); CHEIL INDUSTRIES INC., Gyeongsangbuk-do (KR)

( * ) Notice: Subject to any disclaimer, the term of this patent is extended or adjusted under 35 U.S.C. 154(b) by 443 days.

(21) Appl. No.: 13/962,505

(22) Filed: Aug. 8, 2013

(65) Prior Publication Data

US 2014/0043684 A1 Feb. 13, 2014

(30) Foreign Application Priority Data

Aug. 9, 2012 (KR) .......................... 10-2012-0087388

(51) Int. Cl.
| | |
|---|---|
| *C08F 36/20* | (2006.01) |
| *C08F 22/04* | (2006.01) |
| *C08F 20/08* | (2006.01) |
| *G02B 1/04* | (2006.01) |
| *G02B 1/08* | (2006.01) |
| *G02B 1/00* | (2006.01) |
| *G02B 5/30* | (2006.01) |

(52) U.S. Cl.
CPC . *G02B 1/08* (2013.01); *G02B 1/00* (2013.01); *G02B 1/04* (2013.01); *G02B 5/3083* (2013.01); *C08F 20/08* (2013.01); *C08F 22/04* (2013.01); *C08F 36/20* (2013.01)

(58) Field of Classification Search
CPC ........... G02B 1/04; G02B 1/08; G02B 5/3083; C08F 36/14; C08F 36/20; C08F 136/14; C08F 136/20; C08F 236/14; C08F 236/20; C08F 20/08; C08F 120/10; C08F 220/08; C08F 22/04; C08F 122/04; C08F 222/04
See application file for complete search history.

(56) References Cited

U.S. PATENT DOCUMENTS

| | | | |
|---|---|---|---|
| 4,694,048 A | 9/1987 | Choe | |
| 6,165,309 A | 12/2000 | Burnell et al. | |
| 6,730,741 B1* | 5/2004 | Honda | C08L 27/06 525/228 |
| 7,348,387 B2 | 3/2008 | Matsumoto et al. | |
| 7,462,671 B2 | 12/2008 | Matsumoto et al. | |
| 2005/0020787 A1* | 1/2005 | Aert | C08F 2/22 526/89 |
| 2005/0119418 A1* | 6/2005 | Matsumoto | G02B 1/04 525/329.7 |
| 2005/0176881 A1 | 8/2005 | Bheda et al. | |
| 2007/0243364 A1* | 10/2007 | Maekawa | C08L 33/064 428/220 |
| 2010/0308273 A1* | 12/2010 | Yamago | C08F 120/14 252/301.35 |

FOREIGN PATENT DOCUMENTS

| | | |
|---|---|---|
| JP | 2003155309 | 5/2003 |
| KR | 1019990072394 A | 9/1999 |
| KR | 1020050116139 | 12/2005 |
| KR | 1020070006928 | 1/2007 |
| KR | 1020070100625 A | 10/2007 |
| KR | 100984464 | 9/2010 |

OTHER PUBLICATIONS

Smets et al., Journal of Polymer Science: Part A, 2 (1964) 4825-4834.*
C. Tarducci et al., Synthesis of Cross-Linked Ethylene Glycol Dimethacrylate and Cyclic Methacrylic Anhydride Polymer Structures by Pulsed Plasma Deposiition, Macromolecules, 2002, 35, pp. 8724-8727.

(Continued)

*Primary Examiner* — Roberto Rabago
(74) *Attorney, Agent, or Firm* — Cantor Colburn LLP

(57) ABSTRACT

Disclosed is a polymer comprising a repeating unit represented by Chemical Formula 1, or a polymer comprising a repeating unit represented by Chemical Formula 2:

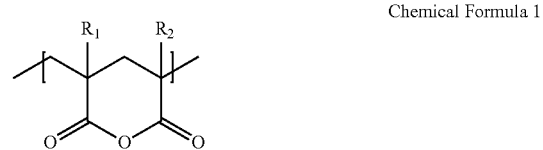

Chemical Formula 1

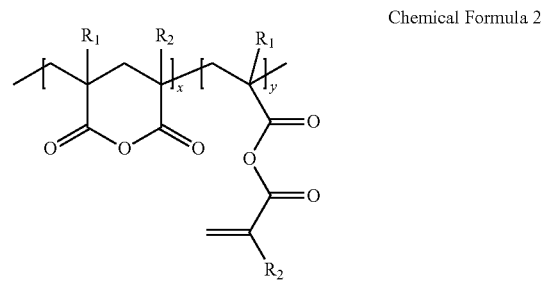

Chemical Formula 2 wherein $R_1$, $R_2$, x and y are as defined herein.

11 Claims, 1 Drawing Sheet

(56) References Cited

OTHER PUBLICATIONS

F. Xi et al., Head-to-Head Polymers. XXIII. Toward Head-to-Head Poly(methyl Methacrylate). Cyclopolymerization of Methacrylic Acid Derivatives: Hydrolysis and Esterification, J. Macromol. Sci.-Chem., A20(3), 1983, pp. 321-339.

G. Smets et al., Cyclopolymerization. V. Copolymerization of Acrylic and Methacrylic Anhydrides with Vinyl Monomers, Journal of Polymer Science (1964), vol. 2, Part. A, pp. 4835-4844.

English Translation of Korean Office Action Dated Feb. 27, 2015 of Corresponding Korean Patent Application No. 10-2012-0087388.

Korean Decision of Allowance, issued on Jul. 31, 2015 with its English Translation.

\* cited by examiner

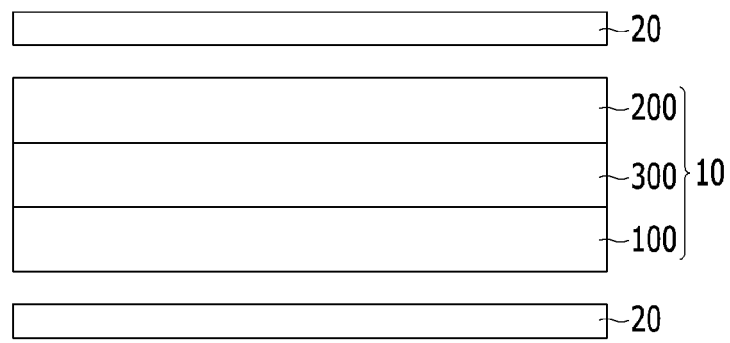

POLYMER FOR OPTICAL FILM, AND OPTICAL FILM INCLUDING SAME

CROSS-REFERENCE TO RELATED APPLICATION

This application claims priority to Korean Patent Application No. 10-2012-0087388, filed on Aug. 9, 2012, and all the benefits occurring therefrom under 35 U.S.C. §119, the entire content of which is incorporated herein in its entirety by reference.

BACKGROUND

1. Field

This disclosure relates to a polymer for an optical film, and an optical film including the same.

2. Description of the Related Art

Flat panel displays may be classified into emitting display devices that emit light by themselves and non-emitting display devices that require separate light sources. Optical compensation films such as phase difference films may be used for improving image quality of the flat panel displays.

In an emitting display device, for example, an organic light emitting display, visibility and contrast ratio may be decreased due to reflection of external light by metals such as the metal in an electrode of the display device. In order to reduce such deterioration, a polarizing plate and a phase difference film are used to prevent the external light reflected in the display device from leaking out of the display device.

In a liquid crystal display ("LCD"), which is a kind of non-emitting display device, elliptical polarization and light leakage may occur due to birefringence of liquid crystal and crossed polarizing plates in the display device, thereby decreasing contrast ratio and causing color shift. An optical compensation film may convert the elliptical polarization into a circular polarization to improve the image quality of the display device.

In order to fabricate a compensating optical film having reverse wavelength dispersion, the method of co-extruding, laminating, or copolymerizing positive birefringence resin and negative birefringence resin is typically used. Further, in order to show positive birefringence, it is known that the refractive index of a polymer should be greatest in a direction parallel to the alignment axis of the main chain of the polymer. For this purpose, side chains that are capable of being aligned in an elongation direction are substituted to the main chain of a polymer. However, the effect is insignificant. In order to effectively increase the refractive index in a direction parallel to the main chain of a polymer, it is known to cyclize the main chain of a polymer. Commercialized polymers, of which the main chain is cyclized to show positive birefringence, are cyclic olefin polymer ("COP") and polycarbonate ("PC"). These polymers are, however, very expensive and the polymerization to obtain these polymers is very difficult.

Accordingly, a polymer for an optical film, such as a compensating film having reverse wavelength dispersion is continuously sought.

SUMMARY

An embodiment provides a polymer for an optical film having positive birefringence.

Another embodiment provides a polymer for an optical film having a reverse wavelength dispersion property, which includes a unit having positive birefringence and a unit having negative birefringence.

Another embodiment provides an optical film including the polymer.

Another embodiment provides a display device including the optical film.

According to an embodiment, provided is a polymer for an optical film that includes a repeating unit represented by following Chemical Formula 1, or a repeating unit represented by following Chemical Formula 2.

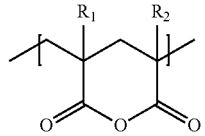

Chemical Formula 1

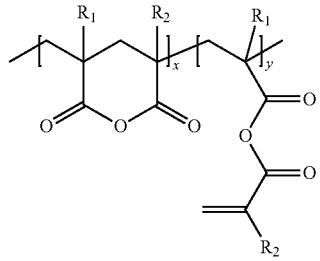

Chemical Formula 2

In Chemical Formulae 1 and 2, $R_1$ and $R_2$ are the same or different and are each independently hydrogen, a substituted or unsubstituted C1 to C10 aliphatic group, a substituted or unsubstituted C3 to C30 alicyclic group, or a substituted or unsubstituted C2 to C30 heterocyclic group; wherein the aliphatic group, the alicyclic group, and the heterocyclic group are present singularly; or at least two of the alicyclic group, and the heterocyclic group are linked to provide a fused cyclic group; or at least two of the aliphatic group, the alicyclic group, and the heterocyclic group are linked via a single bond, or a functional group selected from —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$— and —C(=O)NH—; and x and y are the same or different and are each an integer greater than 0.

The polymer for an optical film may have a number average molecular weight ("Mn") of about 10,000 grams per mole (g/mol) to about 1,000,000 g/mol, and a polydispersity index of about 1.0 to about 5.0.

The polymer for an optical film may have a refractive index of about 1.40 to about 1.70.

The polymer for an optical film may have a glass transition temperature ("$T_g$") of about 80° C. to about 200° C.

The above polymer for an optical film may be prepared by polymerizing a monomer represented by Chemical Formula 3:

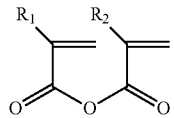

Chemical Formula 3

In Chemical Formula 3, $R_1$ and $R_2$ are the same as described for above Chemical Formulae 1 and 2.

According to another embodiment, an optical film including the polymer including a repeating unit represented by Chemical Formula 1, a polymer including a repeating unit represented by Chemical Formula 2, or combinations thereof is provided.

The optical film may have a total light transmittance of greater than or equal to about 80% at a wavelength range from about 380 nm to about 750 nm.

The optical film may have a haze of less than or equal to about 5%.

The optical film may be elongated at a range of 0≤[(film length after elongation−film length before elongation)/film length before elongation]×100≤200, at an elongation temperature in a range from 20° C. below the glass transition temperature of the polymer to 20° C. above the glass transition temperature of the polymer.

The optical film may have an in-plane phase-difference value ("$R_e$") ranging from about 0 nanometers (nm) to about 200 nm at a wavelength of about 550 nm, and a thickness direction phase-difference value ("$R_{th}$") ranging from about 0 nm to about 500 nm at a wavelength of about 550 nm.

The optical film including a polymer for an optical film that consists of the repeating unit represented by Chemical Formula 1 may have a short wavelength dispersion of an in-plane phase-difference value ("$R_e$") (450 nm/550 nm) being greater than or equal to about 1.0, and a long wavelength dispersion of an in-plane phase-difference value ("$R_e$") (650 nm/550 nm) being less than or equal to about 1.0.

The optical film including a polymer for an optical film that includes the repeating unit represented by Chemical Formula 2 may have a short wavelength dispersion of an in-plane phase-difference value ("$R_e$") (450 nm/550 nm) being less than or equal to about 1.0, and a long wavelength dispersion of an in-plane phase-difference value ("$R_e$") (650 nm/550 nm) being greater than or equal to about 1.0.

According to still another embodiment, a display device including the optical film is provided.

BRIEF DESCRIPTION OF THE DRAWING

The above and other aspects, advantages and features of this disclosure will become more apparent by describing in further detail embodiments thereof with reference to the accompanying drawings in which:

FIG. 1 is a cross-sectional view of an exemplary embodiment of a liquid crystal display ("LCD").

DETAILED DESCRIPTION

This disclosure will be described more fully hereinafter with reference to the accompanying drawings, in which various embodiments are shown. This disclosure may, however, be embodied in many different forms and should not be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present. It will be understood that, although the terms first, second, third etc. may be used herein to describe various elements, components, regions, layers and/or sections, there elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a", "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may typically have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "a combination thereof" refers to a combination comprising at least one of the named constituents, components, compounds, or elements, optionally together with one or more of the same class of constituents, components, compounds, or elements.

As used herein, when a specific definition is not otherwise provided, the term "substituted" refers to a compound or group substituted with a substituent including a halogen (specifically the halogens —F, —Cl, —Br, or —I), a hydroxyl group (—OH), a nitro group (—$NO_2$), a cyano group (—CN), an amino group ($NH_2$, NH($R^{100}$) or N($R^{101}$)($R^{102}$), wherein $R^{100}$, $R^{101}$, and $R^{102}$ are the same or different, and are each independently a C1 to C10 alkyl group), an amidino group ((—C(=NH)$NH_2$)), a hydrazino group (—$NHNH_2$), a hydrazono group (=N—$NH_2$)), a carboxyl group (—$CO_2$R wherein R is hydrogen or a cation), an ester group (—C(=O)OR wherein R is a C1 to C12 alkyl group), a ketone group (—C(=O)—), a substituted or unsubstituted alkyl group, a substituted or unsubstituted alicyclic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, instead of hydrogen of a functional group, or two or more of the forgoing substituents are linked to each other to provide a ring.

As used herein, when a specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refers to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, the term "alkenyl group" refers to a C2 to C30 alkenyl group, and specifically a C2 to C18 alkenyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when a specific definition is not otherwise provided, the term "aliphatic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or C2 to C15 alkynylene group, the term "alicyclic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or C3 to C15 cycloalkynylene group, the term "aromatic group" refers to a C6 to C30 aryl group or C6 to C30 arylene group, and specifically a C6 to C16 aryl group or C6 to C16 arylene group, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or C2 to C30 heteroarylene group that include 1 to 3 heteroatoms selected from O, S, N, P, Si, and a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group that include 1 to 3 heteroatoms selected from O, S, N, P, Si, and a combination thereof in one ring.

As used herein, when a definition is not otherwise provided, "combination" commonly refers to mixing or copolymerization. The term "copolymerization" may refer to random copolymerization, block copolymerization, or graft copolymerization.

According to one embodiment, provided is a polymer for an optical film that includes a repeating unit represented by following Chemical Formula 1, or a repeating unit represented by following Chemical Formula 2.

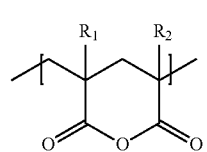

Chemical Formula 1

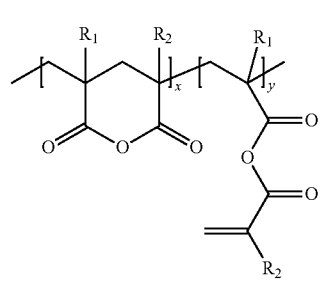

Chemical Formula 2

In Chemical Formulae 1 and 2, $R_1$ and $R_2$ are the same or different and are each independently hydrogen, a substituted or unsubstituted C1 to C10 aliphatic group, a substituted or unsubstituted C3 to C30 alicyclic group, or a substituted or unsubstituted C2 to C30 heterocyclic group; wherein the aliphatic group, the alicyclic group, and the heterocyclic group are present singularly; or at least two of the alicyclic group, and the heterocyclic group are linked to provide a fused cyclic group; or at least two of the aliphatic group, the alicyclic group, and the heterocyclic group are linked via a single bond, or a functional group selected from —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$— and —C(=O)NH—; and x and y are the same or different and are each an integer greater than 0.

As described above, the term "aliphatic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, and specifically a C1 to C15 alkyl group, a C2 to C15 alkenyl group, a C2 to C15 alkynyl group, a C1 to C15 alkylene group, a C2 to C15 alkenylene group, or C2 to C15 alkynylene group.

As described above, the term "alicyclic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or C3 to C30 cycloalkynylene group, and specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or C3 to C15 cycloalkynylene group.

As described above, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or C2 to C30 heteroarylene group that include 1 to 3 heteroatoms selected from O, S, N, P, Si, and a combination thereof in one ring, and specifically a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group, wherein the foregoing heterocyclic groups each include 1 to 3 heteroatoms selected from O, S, N, P, Si, and a combination thereof in one ring. Other heteroatoms may also be present.

Particularly, both $R_1$ and $R_2$ in Chemical Formulae 1 and 2 may be aliphatic groups, specifically, C1 to C30 alkyl groups, C2 to C30 alkenyl groups, or C2 to C30 alkynyl groups, more specifically, C1 to C6 alkyl groups, C2 to C6 alkenyl groups, or C2 to C6 alkynyl groups, and even more specifically, both $R_1$ and $R_2$ may be methyl groups, but are not limited thereto.

Other units may be present in the polymer including the units represented by Chemical Formula 1 or Chemical Formula 2, provided that such other units do not significantly adversely affect the desired characteristics of the polymer, in particular, it optical properties as described below.

The polymer including (i.e., comprising, consisting essentially, or consisting of) the repeating unit represented by Chemical Formula 1 has positive birefringence, in which the refractive index in a direction of the main chain of the polymer is the greatest by the elongation process. While the optical film including the polymer has a forward wavelength dispersion, it has a low wavelength dispersion value of about 1.0, equivalent to that of the cyclic olefin polymer ("COP"), which is a commercialized positive birefringence resin in the art. Therefore, the polymer may be used in the preparation of an optical compensation film that has reverse wavelength dispersion, in combination with a polymer that is known in the art and has a negative birefringence or with a polymer including the repeating unit represented by Chemical Formula 2, as described below.

In the polymer including (i.e., comprising, consisting essentially of, or consisting of) the repeating unit represented by Chemical Formula 2, the cyclized portion in the repeating unit exhibits positive birefringence, while the other portions in the repeating unit negative birefringence, and thus, the polymer itself may have reverse dispersion due to the combination of the positive and negative birefringence therein. Accordingly, the polymer including the repeating unit represented by Chemical Formula 2 may be used alone to prepare an optical compensation film, or alternatively, may be used in combination with another polymer that is known in the art as having positive or negative birefringence to prepare an optical compensation film.

In the repeating unit represented by Chemical Formula 2, the ratio between the cyclized portion and the other portion in the unit, that is, the ratio between x and y in the unit, may be optimized to prepare a polymer having a desired reverse dispersion, by combination of appropriate positive and negative birefringence.

For instance, the ratio between x and y may be from about 0.1:99.9 to about 99.9:0.1, for example, from 10:90 to 90:10, for example, from 20:80 to 80:20. However, the mole ratio between the x and y is not limited thereto, and it is apparent that an ordinary skill in the art could appropriately select and employ the ratio depending on the type of the substituents $R_1$ and $R_2$, to prepare a polymer having reverse wavelength dispersion due to the combination of the positive and negative birefringence of the polymer. The individual units denoted by x and y in Chemical Formula 2 may be arranged in any configuration, for example randomly or in blocks.

The polymer for an optical film may have a number average molecular weight (Mn) of about 10,000 grams per mole (g/mol) to about 1,000,000 g/mol. When the polymer for an optical film has a number average molecular weight within the range, the polymer for an optical film may have a melting viscosity effective to facilitate the formation of a film. In an embodiment, the polymer for an optical film may have a number average molecular weight (Mn) of about 10,000 g/mol to about 500,000 g/mol, specifically about 10,000 g/mol to about 200,000 g/mol.

The polymer for an optical film may have a polydispersity index ("PDI") of about 1.0 to about 5.0. When the polymer for an optical film has a polydispersity index within the range, the polymer for an optical film may have excellent or improved quality, reproducibility, and uniformity of the film. In an embodiment, the polymer for an optical film may have a polydispersity index of about 1.5 to about 4.0, specifically about 1.8 to about 3.0.

The polymer for an optical film may have a refractive index of about 1.40 to about 1.70. When the polymer for an optical film has a refractive index within the range, an optical film made of the polymer for an optical film may have an effective phase-difference value. In an embodiment, the polymer for an optical film may have a refractive index of about 1.40 to about 1.60.

The polymer for an optical film may have glass transition temperature ("$T_g$") of about 80° C. to about 200° C. When the polymer for an optical film has a glass transition temperature within the range, an optical film made of the polymer for an optical film may have excellent or improved heat resistance. In an embodiment, the polymer for an optical film may have a glass transition temperature ($T_g$) of about 90° C. to about 180° C., specifically about 100° C. to about 160° C.

Accordingly, the polymer for an optical film may be used to fabricate various optical films for complementing wide viewing angle.

Hereinafter, a method of preparing the polymer for an optical film is illustrated.

In an embodiment, the polymer for an optical film may be prepared by polymerizing a monomer represented by Chemical Formula 3.

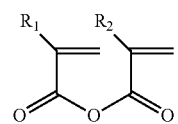

Chemical Formula 3

In Chemical Formula 3, $R_1$ and $R_2$ are the same as defined in Chemical Formula 1 or 2.

The monomer represented by Chemical Formula 3 may be polymerized by any polymerization method well-known in the art to prepare a polymer having the repeating unit represented by Chemical Formula 1 or the repeating unit represented by Chemical Formula 2, and the method is not limited to any specific method. For example, the method may include bulk polymerization, solution polymerization, dispersion polymerization, emulsion polymerization, etc., using free radical polymerization.

For example, the monomer represented by Chemical Formula 3 may be dissolved in an appropriate organic solvent to be subjected to polymerization reaction. For example, in order to prepare a polymer consisting of the repeating unit represented by Chemical Formula 1, the monomer represented by Chemical Formula 3 may be dissolved in an formamide solvent, such as, dimethyl formamide, diethyl formamide, etc.; a acetamide solvent, such as dimethyl acetamide, diethyl acetamide, etc.; cyclohexanone; or acrylonitrile, etc., to be subjected to the polymerization reaction to prepare the polymer. The solvent may be used alone or in combination thereof. However, the solvent is not limited thereto.

For example, in order to prepare a polymer including the repeating unit represented by Chemical Formula 2, the monomer represented by Chemical Formula 3 may be dissolved in a sulfoxide solvent, such as, dimethyl sulfoxide (DMSO), diethyl sulfoxide, etc., to prepare a polymer in which some monomers are cyclized and the other monomers are not cyclized. The solvent may be used alone or in combination thereof. However, the solvent is not limited thereto.

The polymerization method is well known in the art, and thus any solvent, which is not mentioned in the above, but can be used to prepare a polymer having the repeating unit represented by Chemical Formula 1 or Chemical Formula 2 from the monomer represented by Chemical Formula 3, may also be used to prepare the polymer according to an embodiment of the invention. Such solvent may be used alone or in combination thereof.

When the solvent is used, the solvent may be used in an amount of about 50 parts by weight to about 1,000 parts by weight, based on 100 parts by weight of the monomer represented by Chemical Formula 3, but may be adjusted to obtain a desired molecular weight and dispersibility and is not limited to the foregoing range.

The monomers may be easily polymerized by an azo-containing or a peroxide-containing initiator and form the polymer for an optical film without the use of a metal catalyst. Polymers formed under these conditions have excellent or improved processability and economic feasibility.

According to another embodiment, a metal catalyst instead of the free radical initiator may be used. However, the use of a metal catalyst may make it difficult to control a manufacturing process, and may make the process complex, deteriorating processability and economic feasibility. In addition, it is possible the metal catalyst may not be completely removed from the polymer, and some of the impurities or metal catalyst residue may remain, which may scatter light and be seen as a color stain.

The peroxide-containing initiator may include benzoyl peroxide, t-butylperoxy-2-ethyl hexanoate, dicumyl peroxide, t-butyl peroxide, 1,1-di(t-butylperoxy)cyclohexane, dibenzoyl peroxide, 2-butanone peroxide, t-butyl perbenzoate, 2,5-bis(t-butylperoxy)-2,5-dimethylhexane, bis(t-butylperoxyisopropyl)benzene, t-butyl hydroperoxide, and a combination thereof, but is not limited thereto.

The peroxide-containing initiator may be used in an amount of about 0.001 parts by weight to about 10 parts by weight based on 100 parts by weight of the monomer.

The polymerization may be performed at a temperature ranging from about 60° C. to about 200° C., specifically about 70° C. to about 150° C., and more specifically about 80° C. to about 150° C. The polymerization may be performed with a reaction time ranging from about 1 hour to about 48 hours, and specifically about 10 hours to about 24 hours.

The polymerization may be conducted in the presence of an inactive gas, for example, nitrogen, helium, argon, etc.

When the polymerization is performed within the foregoing process condition ranges, the polymer may have a desired number average molecular weight and dispersibility, and a stable polymerization yield may be achieved, for example, a polymerization yield of greater than or equal to about 60%.

According to another embodiment, an optical film including the polymer for an optical film is provided.

The polymer including, and in particular consisting of the repeating unit represented by Chemical Formula 1 has positive birefringence, in which the refractive index in a direction of the main chain of the polymer is the greatest by the elongation process. Therefore, the polymer may be used in the preparation of an optical compensation film that has reverse wavelength dispersion, in combination with a polymer that is known in the art and has a negative birefringence or with a polymer including the repeating unit represented by Chemical Formula 2, as described above.

In the polymer including, and in particular consisting of the repeating unit represented by Chemical Formula 2, the cyclized portion in the repeating unit exhibits positive birefringence, while the other portions in the repeating unit negative birefringence, and thus, the polymer itself may have reverse dispersion due to the combination of the positive and negative birefringence therein. Accordingly, the polymer including the repeating unit represented by Chemical Formula 2 may be used alone to prepare an optical compensation film, or alternatively, may be used in combination with another polymer that is known in the art as having positive or negative birefringence to prepare an optical compensation film.

In the repeating unit represented by Chemical Formula 2, the ratio between the cyclized portion and the other portion in the unit, that is, the ratio between x and y in the unit, may be adjusted to obtain a polymer having a desired reverse dispersion due to the combination of appropriate positive and negative birefringence.

For instance, as described in the above, the ratio between x and y of Chemical Formula 2 may be from 0.1:99.9 to 99.9:0.1, for example, from 10:90 to 90:10, for example, from 20:80 to 80:20, to obtain a polymer for an optical film having an appropriate reverse wavelength dispersion.

The polymerization to make the polymer including the repeating unit represented by Chemical Formula 1 or the repeating unit represented by Chemical Formula 2 is simpler and cheaper than the polymerization to make COP (cyclic olefin polymer) or PC (polycarbonate), which are commercialized resins having positive birefringence. Thus the polymerization to make the polymer according to an embodiment of the disclosure may be cost competitive.

Further, the polymer including the repeating unit represented by Chemical Formula 2 may be used alone without another polymer having positive or negative birefringence in fabricating an optical film having reverse wavelength dispersion, by comprising appropriate combination of positive and negative birefringence units by adjusting the ratio of cyclization of the monomer represented by Chemical Formula 3 during polymerization process.

The optical film may have total light transmittance of greater than or equal to about 80% at a wavelength ranging from about 380 nm to about 780 nm. When the optical film has light transmittance within the foregoing range, the optical film may not deteriorate luminescence characteristics and color reproducibility. In an embodiment, the optical film may have total light transmittance of greater than or equal to about 90% at a wavelength ranging from about 380 nm to about 780 nm.

The optical film may have a haze of less than or equal to about 5%. When the optical film has a haze within the foregoing range, the optical film may be effectively transparent and may have excellent or improved clarity. In an embodiment, the optical film may have a haze of less than or equal to about 3%, and more specifically, less than or equal to about 1%.

The optical film has an in-plane phase-difference value ("$R_e$") ranging from about 0 nanometers (nm) to about 200 nm at a wavelength of about 550 nm. When the optical film has an in-plane phase-difference value ("$R_e$") within the range, it may be effectively used for various applications, including optical devices.

The optical film including the polymer consisting of the repeating unit represented by Chemical Formula 1 may have a short wavelength dispersion of the in-plane phase-difference value ("$R_e$") (450 nm/550 nm) of greater than or equal to about 1.0. In addition, the optical film may have long wavelength dispersion of the in-plane phase-difference value ("$R_e$") (650 nm/550 nm) of less than or equal to about 1.0.

The optical film including a polymer for an optical film that includes the repeating unit represented by Chemical Formula 2 may have a short wavelength dispersion of an in-plane phase-difference value ("$R_e$") (450 nm/550 nm) being less than or equal to about 1.0, and a long wavelength dispersion of an in-plane phase-difference value ("$R_e$") (650 nm/550 nm) being greater than or equal to about 1.0.

Herein, the short wavelength dispersion of the in-plane phase-difference value ("$R_e$") (450 nm/550 nm) is obtained by dividing an in-plane phase-difference value ("$R_e$") at a wavelength of about 450 nm by an in-plane phase-difference value ("$R_e$") at a wavelength of about 550 nm. The long wavelength dispersion of the in-plane phase-difference value ("$R_e$") (650 nm/550 nm) is obtained by dividing an in-plane phase-difference value ("$R_e$") at a wavelength of about 650 nm by an in-plane phase-difference value ("$R_e$") at a wavelength of about 550 nm.

When the optical film including the polymer consisting of the repeating unit represented by Chemical Formula 1 has the short and long wavelength dispersions within the foregoing ranges, it may have effective positive birefringence, and then may be combined with a polymer having a negative birefringence, thus exhibiting effective reverse wavelength dispersion.

When the optical film including the polymer including the repeating unit represented by Chemical Formula 2 has the short and long wavelength dispersions within the foregoing ranges, it may have effective reverse wavelength dispersion by comprising an appropriate combination of positive birefringence and negative birefringence.

The optical film may have a yellow index ("YI") of less than or equal to about 5.0. When the optical film has a yellow index ("YI") within the foregoing range, it may be transparent and colorless. In an embodiment, the optical film may have a yellow index ("YI") ranging from about 0.1 to about 3.0.

The optical film may have a thickness ranging from about 0.01 micrometers (μm) to about 1,000 μm, but is not limited thereto, and the thickness may be adjusted depending on the application of the optical film.

The optical film may have a glass transition temperature ("$T_g$") of about 80° C. to about 200° C. When the optical film has a glass transition temperature within the foregoing range, it may have excellent or improved heat resistance and a wider process condition range in the elongation process and the like. In an embodiment, the optical film may have a glass transition temperature ("$T_g$") of about 90° C. to about 180° C., and more specifically about 100° C. to about 160° C.

The optical film may be formed by known methods, for example, by forming a film including the monomer represented by Chemical Formula 3, and then polymerizing the monomer as described above; or by polymerizing the monomer represented by Chemical Formula 3 and forming a film from the polymerized product. Methods for film formation are known, and include, for example, molding, extruding, casting, such as solution casting, coating, such as spin coating, and the like. In an embodiment, the optical film may be fabricated by melting the polymer for an optical film or dissolving it in an organic solvent, and then disposing the melted polymer or the polymer solution in a mold and compressing it into a sheet and elongating the sheet. Herein, the elongating of the sheet may be performed in a direction of one axis or performed sequentially or simultaneously in a direction of two axes. A main chain of the polymer is aligned in an elongation axis direction by the elongating process and the cyclic structure in the repeating unit represented by Chemical Formula 1 is aligned in a parallel direction to the alignment axis of the main chain of the polymer, such that the elongated sheet, i.e., the optical film may effectively show positive birefringence. In the case of the polymer including the repeating unit represented by Chemical Formula 2, the unit represented by x is aligned in a parallel direction to the alignment axis of the main chain of the polymer, while the unit represented by y is aligned in a perpendicular direction to the alignment axis of the main chain of the polymer, such that the elongated sheet, i.e., the optical film may show an optical property due to the combination of the positive and negative birefringence.

The sheet may be fabricated by compressing the melted polymer or the polymer solution with a high pressure at a temperature ranging from about 200° C. to about 300° C. According to another embodiment, the sheet may be fabricated by discharging the melted polymer or the polymer solution in a chill roll through a T-die, without limitation.

The sheet may be elongated at a range of 0≤[(film length after elongation−film length before elongation)/film length before elongation]×100≤200, at an elongation temperature ("T° C."), Tg−20° C.≤T° C. Tg+20° C., i.e., at a T° C. in a range from 20° C. below the glass transition temperature of the polymer to 20° C. above the glass transition temperature of the polymer.

The sheet may be elongated at a temperature ranging from about 80° C. to about 150° C.

In addition, the sheet may be elongated at an elongation rate ranging from about 10% to about 300%, specifically about 20% to about 200%, and more specifically, about 20% to about 100%. Herein, the elongation rate may be calculated according to the following Equation 1.

$$\text{Elongation rate (\%)} = (L - L_0/L_0) \times 100 \quad \quad \text{Equation 1}$$

In Equation 1,
$L_0$ refers to a length of a sheet before the elongation, and
$L$ refers to a length of a sheet after the elongation.

When the optical film is prepared merely with the polymer consisting of the repeating unit represented by Chemical Formula 1, the film would show positive birefringence. Accordingly, it is possible to fabricate an optical compensation film having reverse wavelength dispersion to complement wide viewing angle by laminating another film including a polymer having negative birefringence onto the above film having positive birefringence.

When the optical film is prepared with the polymer including the repeating unit represented by Chemical Formula 2, the film may show reverse wavelength dispersion by comprising a combination of the positive and negative birefringence, thus the polymer alone may be used to obtain the optical film. Alternatively, even when the film is prepared with the polymer including the repeating unit represented by Chemical Formula 2, another polymer having positive or negative birefringence may be combined with the polymer including the repeating unit represented by Chemical Formula 2 to prepare an optical film, depending on the positive or negative birefringence of the film.

According to another embodiment, a display device including the optical film is provided. In an embodiment, the display device may be a liquid crystal display ("LCD"), an organic light emitting diode ("OLED") device, and the like, but is not limited thereto.

According to an embodiment, a liquid crystal display ("LCD") including the optical film is described referring to FIG. 1.

FIG. 1 is a cross-sectional view of an exemplary embodiment of an LCD.

Referring to FIG. 1, the LCD according to one embodiment includes a liquid crystal display panel 10 and optical films 20 disposed on both the lower part and the upper part of the liquid crystal display panel 10.

The liquid crystal display panel 10 may be a twisted nematic (TN) mode panel, a patterned vertical alignment (PVA) mode panel, or the like, but is not limited thereto.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (TFT, not shown) and a first field generating electrode (not shown) connected to the TFT formed on a substrate (not shown). The second display panel 200 may include, for example, a color filter (not shown) and a second field generating electrode (not shown) formed on the substrate.

The liquid crystal layer 300 may include a plurality of liquid crystal molecules. The liquid crystal molecules may have positive or negative dielectric anisotropy. When the liquid crystal molecules have positive dielectric anisotropy, the long axis of the liquid crystal molecules may be aligned substantially parallel to the surface of the first display panel 100 and the second display panel 200 when not applying an electric field, and may be aligned substantially perpendicular to the surface of the first display panel 100 and the second display panel 200 when applying an electric field.

Alternatively, when the liquid crystal molecules have negative anisotropy, the long axis thereof may be aligned substantially perpendicular to the surface of the first display panel 100 and the second display panel 200 when not applying an electric field, and may be aligned substantially parallel to the surface of the first display panel 100 and the second display panel 200 when applying an electric field.

The optical films 20 are disposed on the outside of the liquid crystal display panel 10. Although the optical films 20 are shown to be disposed on the upper part and lower part of the liquid crystal display panel 10 in the drawing, it may be formed on either the upper part or the lower part of liquid crystal display panel 10.

As described above, the optical film 20 may be an elongated film including the polymer for an optical film that includes a repeating unit A including a repeating unit represented by the Chemical Formula 1; or a repeating unit B including a repeating unit represented by the Chemical Formula 2, and may act as a compensation film.

EXAMPLES

Hereinafter, the present disclosure is illustrated in more detail with reference to examples. However, they are exemplary embodiments, and the present disclosure is not limited thereto.

Example 1

Preparation of Polymer for Optical Film

About 10 g (about 65 mmol) of methacrylic anhydride is dissolved in about 10 g (about 137 mmol) of DMF (dimethyl formamide), and about 120 mg (about 0.46 mmol) of 1,1-di(tert-butylperoxy)cyclohexane (Perhexa C, 79% purity, manufactured by NOF, Japan) is added thereto and agitated and reacted for about 24 hours while refluxing under the nitrogen ($N_2$) atmosphere at about 110° C. to provide a polymer for an optical film in accordance with the following reaction scheme.

The yield of the cyclic poly methacrylic anhydride is about 91%.

The obtained polymer for an optical film has a weight average molecular weight (Mw) of about 193,000 g/mol, a number average molecular weight (Mn) of about 96,000 g/mol, and a polydispersity index of about 2.00. The obtained polymer for an optical film has a refractive index of about 1.51, and its glass transition temperature, Tg, is about 150° C.

Example 2

Preparation of Polymer for Optical Film

Methacrylic anhydride is dissolved in DMSO (dimethyl sulfoxide) as a solvent and added with the 1,1-di(tert-butylperoxy)cyclohexane (Perhexa C, 79% purity, manufactured by NOF, Japan) thereto in accordance with the ratio as described in Table 1 below, and the mixture is agitated and reacted for about 16 hours while refluxing under the nitrogen ($N_2$) atmosphere at about 110° C. to provide a polymer for an optical film in accordance with the following reaction scheme. The yield of the polymer and the ratio between x and y in the polymer are also described in below Table 1.

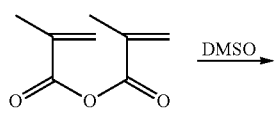

-continued

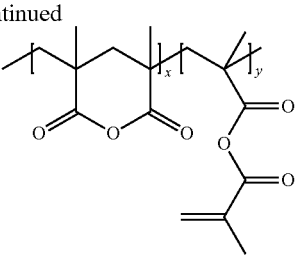

TABLE 1

| | Methacrylic anhydride | Perhexa C | DMSO | Yield of the polymer for optical film | x:y in the polymer |
|---|---|---|---|---|---|
| Reaction mixture 1 | 5 g | 0.06 g | 5 g | 67% | 73:27 |
| Reaction mixture 2 | 50 g | 0.3 g | 150 g | 65% | 78:22 |
| Reaction mixture 3 | 5 g | 0.03 g | 50 g | 60% | 80:20 |

The glass transition temperature (Tg) of the polymer is 115° C. and the refractive index is 1.52.

Experimental Example 1

Preparation of Optical Film and Analysis of the Optical Film

Each of the polymers for an optical film according to Example 1 and Example 2 is dissolved in 50 wt % of DMF or in 45 wt % of DMF for solvent casting. That is, the solution is poured onto a substrate, and the solvent is evaporated to obtain a sheet. Then the sheet is elongated to obtain an optical film. In this case, three films (Film A, Film B, and Film C) prepared with the polymer according to Example 1, and one film (Film D) prepared with the polymer according to Example 2 are elongated for analysis.

Elongation conditions and the optical properties of the elongated and prepared optical films are described in below Table 2.

TABLE 2

| | Wavelength Dispersion | | Alignment Angle | Thickness | Elongation Condition |
|---|---|---|---|---|---|
| | 450 nm/ 550 nm | 650 nm/ 550 nm | | | |
| Film A | 1.02 | 0.99 | 2.44° | 145 μm | 80° C., 30% |
| Film B | 1.02 | 0.99 | 1.06° | 75 μm | 80° C., 50% |
| Film C | 1.00 | 1.00 | 4.4° | 89 μm | 90° C., 50% |
| Film D | 0.87 | 1.07 | −1.0° | 85 μm | 125° C., 50% |

Referring to Table 2, all optical films, Films A to C, prepared with the polymer according to Example 1 show positive birefringence, and show diversity in the wavelength dispersion in accordance with the elongation temperature.

Film D, prepared with the polymer according to Example 2, also shows positive birefringence as exhibiting the alignment angle of −1.0°, while this shows reverse wavelength dispersion according to the result of the wavelength dispersion.

Without wishing to be bound by theory, it is hypothesized that the reason Film D shows positive birefringence is that as shown in Table 1, the ratio between x and y (x:y) of the polymer according to Example 2 is in the range between about 70:30 and about 80:20, such that the cyclized repeating unit, which is in parallel to the alignment axis in the polymer, is present in a higher ratio than the part which is not cyclized in the polymer. Accordingly, when preparing a polymer for an optical film according to Example 2, it is possible to prepare an optical film that has desired positive birefringence or negative birefringence, or desired forward wavelength dispersion or reverse wavelength dispersion, by adjusting the x and y ratio in the polymer.

As described above, preparing an optical film using a polymer including the repeating unit represented by Chemical Formula 1 or the repeating unit represented by Chemical Formula 2 is simpler than preparing an optical film using commercialized polymers. Further, the polymer is cheaper than the commercialized polymers, such that the cost competitive optical films having positive birefringence, or having the combination of positive and negative birefringence may be easily prepared using the polymer. Furthermore, when using the polymer including the repeating unit represented by Chemical Formula 2, it is possible to prepare an optical film having desired reverse wavelength dispersibility without using any additional polymer.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An optical film consisting of a polymer consisting of a repeating unit represented by Chemical Formula 2:

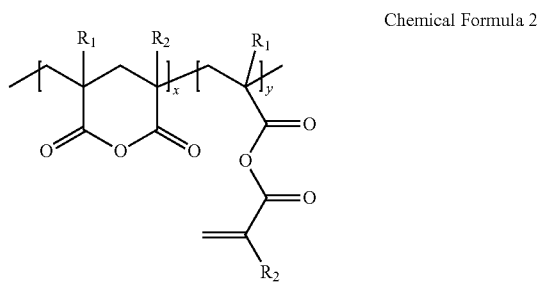

Chemical Formula 2 wherein in Chemical Formula 2,
$R_1$ and $R_2$ are the same or different and are each independently hydrogen, a substituted or unsubstituted C1 to C10 aliphatic group, a substituted or unsubstituted C3 to C30 alicyclic group, or a substituted or unsubstituted C2 to C30 heterocyclic group;
wherein the aliphatic group, the alicyclic group, and the heterocyclic group are present singularly; or at least two of the alicyclic group, and the heterocyclic group are linked to provide a fused cyclic group; or at least two of the aliphatic group, the alicyclic group, and the heterocyclic group are linked via a single bond, or a functional group selected from —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$— and —C(=O)NH—; and
x and y are the same or different and are each an integer greater than 0; and
wherein the optical film has a short wavelength dispersion of an in-plane phase-difference value (450 nm/550 nm)

being less than or equal to about 1.0, and a long wavelength dispersion of an in-plane phase-difference value (650 nm/550 nm) being greater than or equal to about 1.0.

2. The optical film of claim 1, wherein $R_1$ and $R_2$ are the same or different and are each independently a C1 to C6 alkyl group, a C2 to C6 alkenyl group, or a C2 to C6 alkynyl group.

3. The optical film of claim 1, wherein the ratio of x to y in Chemical Formula 2 is from about 0.1:99.9 to about 99.9:0.01.

4. The optical film of claim 1, wherein the polymer has a number average molecular weight of about 10,000 grams per mole to about 500,000 grams per mole.

5. The optical film of claim 1, wherein the polymer has a refractive index of about 1.40 to about 1.70.

6. The optical film of claim 1, wherein the polymer has a glass transition temperature of about 80° C. to about 200° C.

7. The optical film of claim 1, wherein the polymer has a polydispersity index of about 1.0 to about 5.0.

8. The optical film of claim 1, wherein the film has a total light transmittance of greater than or equal to about 80% at a wavelength ranging from about 380 nm to about 750 nm.

9. The optical film of claim 1, wherein the film is elongated at a range of 0≤[(film length after elongation−film length before elongation)/film length before elongation]×100≤200, at an elongation temperature in a range from 20° C. below the glass transition temperature of the polymer to 20° C. above the glass transition temperature of the polymer.

10. The optical film of claim 1, wherein the film has an in-plane phase-difference value ranging from about 0 nanometers to about 200 nanometers at a wavelength of about 550 nanometers, and a thickness direction phase-difference value ranging from about 0 nanometer to about 500 nanometers at a wavelength of about 550 nanometers.

11. A display device comprising the optical film of claim 1.

* * * * *